Figure 1:
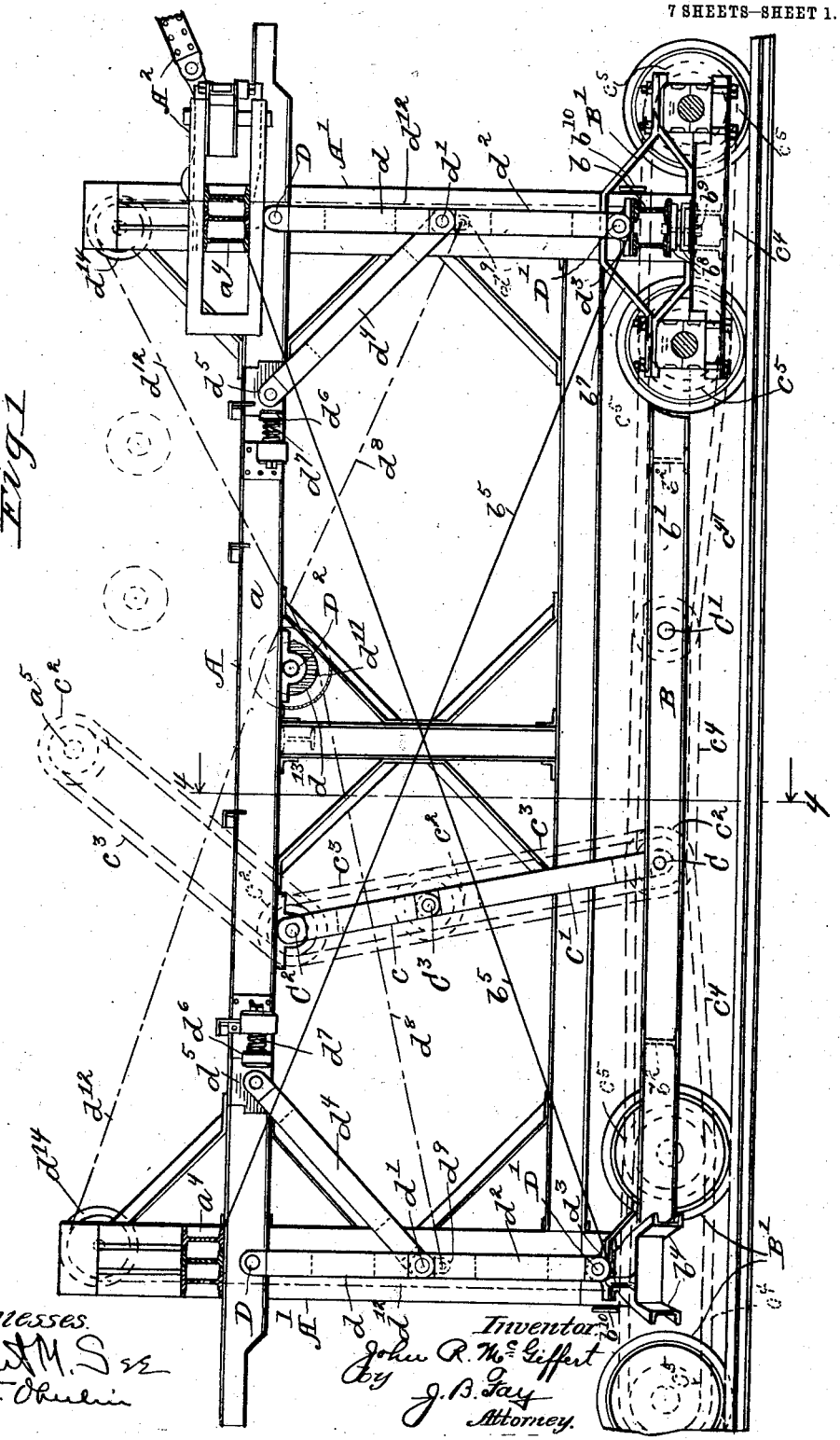

J. R. McGIFFERT.
LOG LOADING MACHINE.
APPLICATION FILED MAR. 31, 1910.

1,009,542.

Patented Nov. 21, 1911.

7 SHEETS—SHEET 3.

Witnesses.

Inventor.
John R. McGiffert
by
J. B. Fay
Attorney.

J. R. McGIFFERT.
LOG LOADING MACHINE.
APPLICATION FILED MAR. 31, 1910.

1,009,542.

Patented Nov. 21, 1911.

7 SHEETS—SHEET 6.

Witnesses.
Robert M. See
Jno. F. Oberlin

Inventor.
John R. McGiffert
by J. B. Fay
Attorney.

J. R. McGIFFERT.
LOG LOADING MACHINE.
APPLICATION FILED MAR. 31, 1910.

1,009,542.

Patented Nov. 21, 1911.

7 SHEETS—SHEET 7.

Witnesses.

Inventor
John R. McGiffert
by J. B. Fay
Attorney

UNITED STATES PATENT OFFICE.

JOHN R. McGIFFERT, OF DULUTH, MINNESOTA, ASSIGNOR TO CLYDE IRON WORKS, OF DULUTH, MINNESOTA, A CORPORATION OF MINNESOTA.

LOG-LOADING MACHINE.

1,009,542.     Specification of Letters Patent.    Patented Nov. 21, 1911.

Application filed March 31, 1910. Serial No. 552,731.

*To all whom it may concern:*

Be it known that I, JOHN R. McGIFFERT, a citizen of the United States, and a resident of Duluth, county of St. Louis, and State of Minnesota, have invented a new and useful Improvement in Log-Loading Machines, of which the following is a specification, the principle of the invention being herein explained and the best mode in which I have contemplated applying that principle, so as to distinguish it from other inventions.

The improvements in question relate more particularly to log loaders of the McGiffert type, as they are known to the trade. The general form of this type of machine has been disclosed in U. S. Letters Patent No. 715,840 issued to me December 16, 1902. In general such McGiffert loader is characterized by having a frame or body portion adapted to span a track and provided with standards adapted to rest at their lower ends upon the rails or rail bed of said track, so as to permit the passage of cars on the latter beneath the frame and between said standards. Such frame carries suitable hoisting mechanism whereby logs or the like may be raised and placed upon such cars, as they emerge. Said frame is further provided with means whereby it may be rendered movable upon a track, said latter means being removable from the track so as to permit cars to pass in the fashion just described, when the loader is set up for use.

The present improvements have as their object, the provision of transporting means for a loader of the type referred to, capable of utilizing more than the four wheels characterizing the specific form of such means disclosed in the patent in question; for while such fewer number of wheels permits of a simpler construction and has been found serviceable under conditions generally obtaining, I have found that with loaders of increased weight, a larger number of wheels is desirable in order to properly sustain the frame, especially where the rails are too light to support a quarter of the weight of the machine on each wheel. The present construction is furthermore designed to provide for the use of pivoted trucks so as to enable the machine to run readily around sharp curves.

With a view then to the accomplishment of the foregoing and related ends, said invention consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 2:
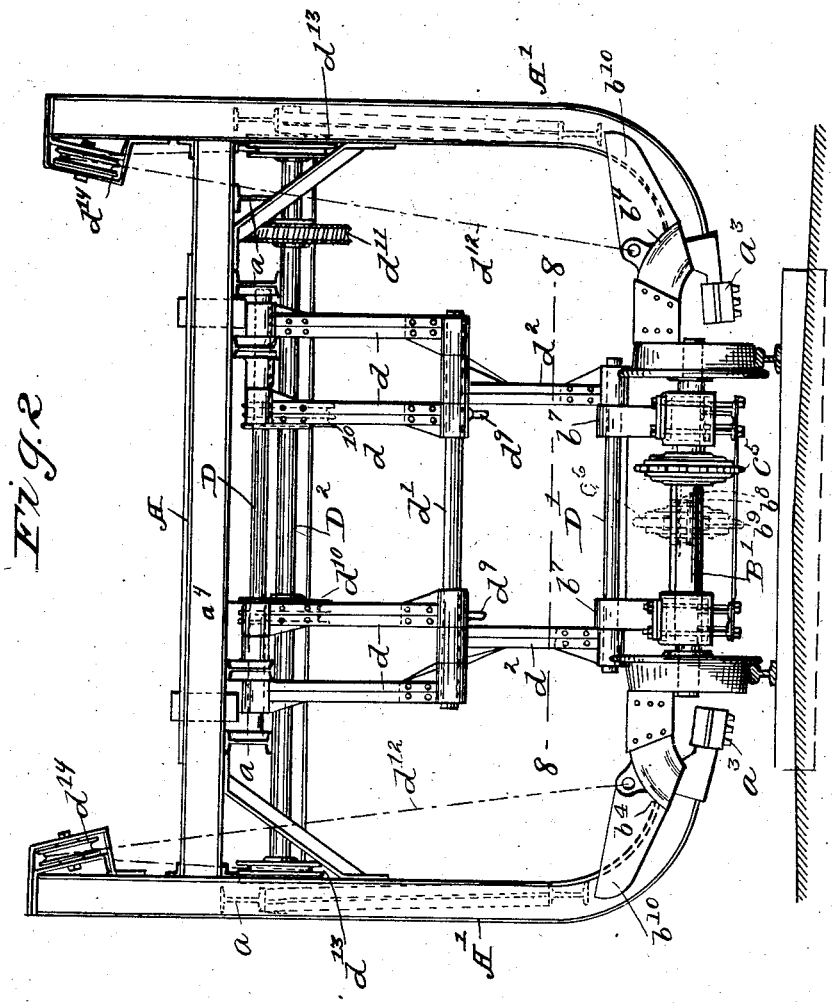
Figure 3:
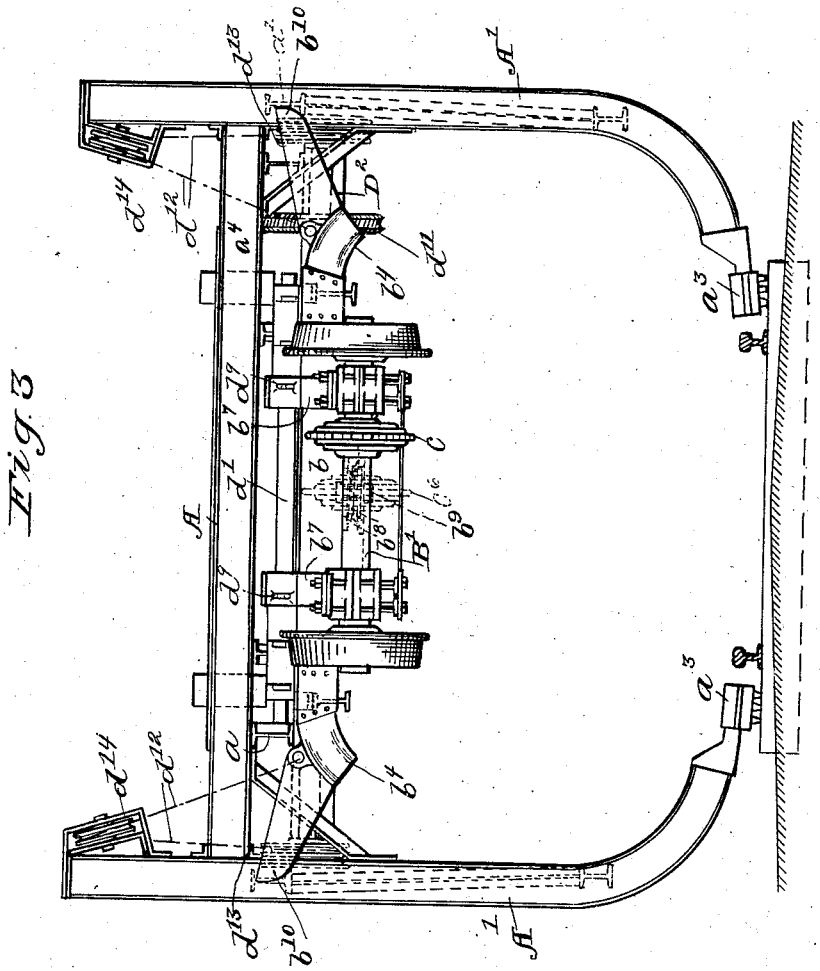
Figure 4:
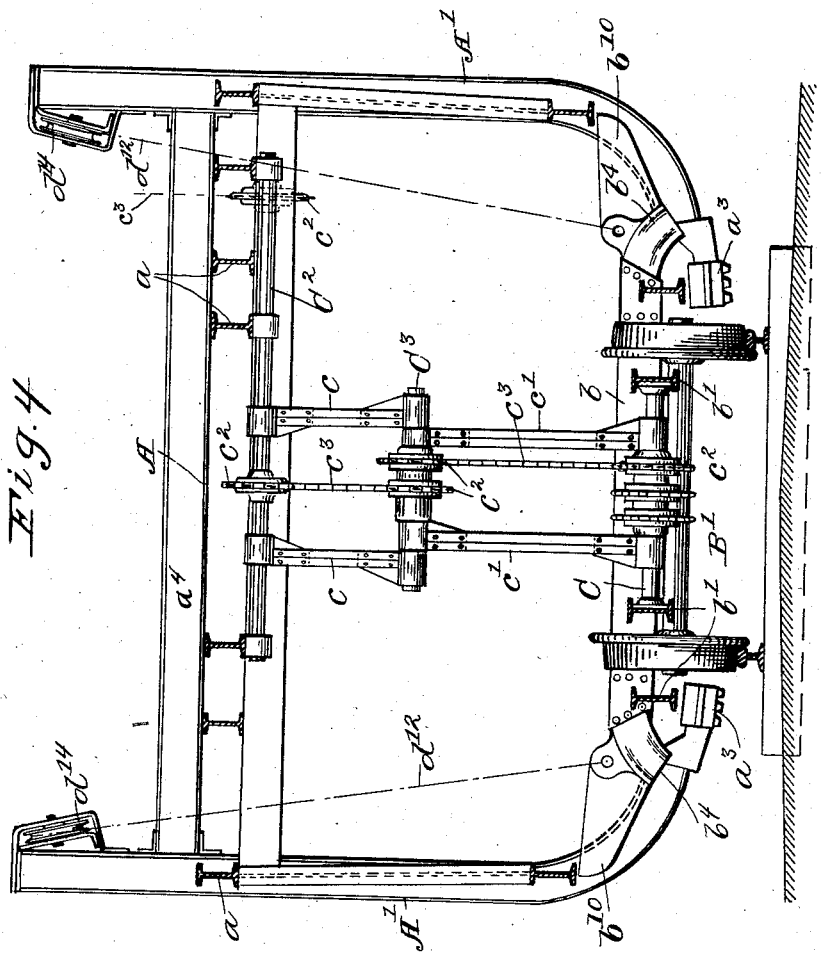
Figure 5:
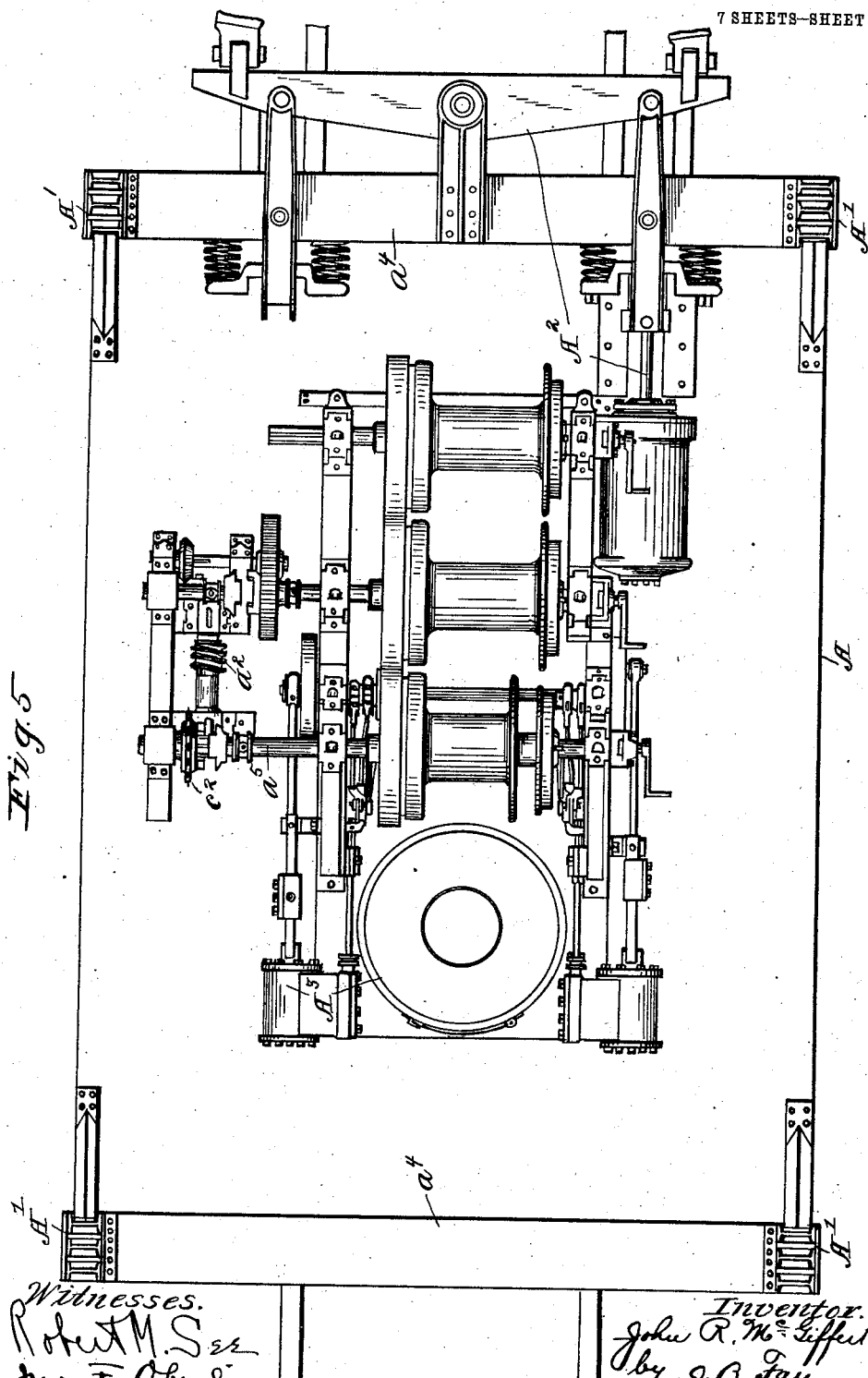
Figure 6:
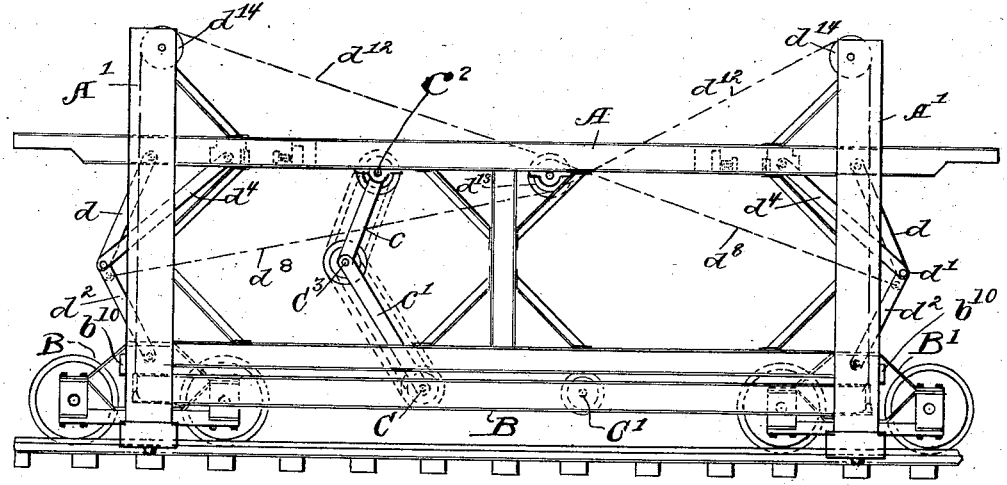
Figure 7:
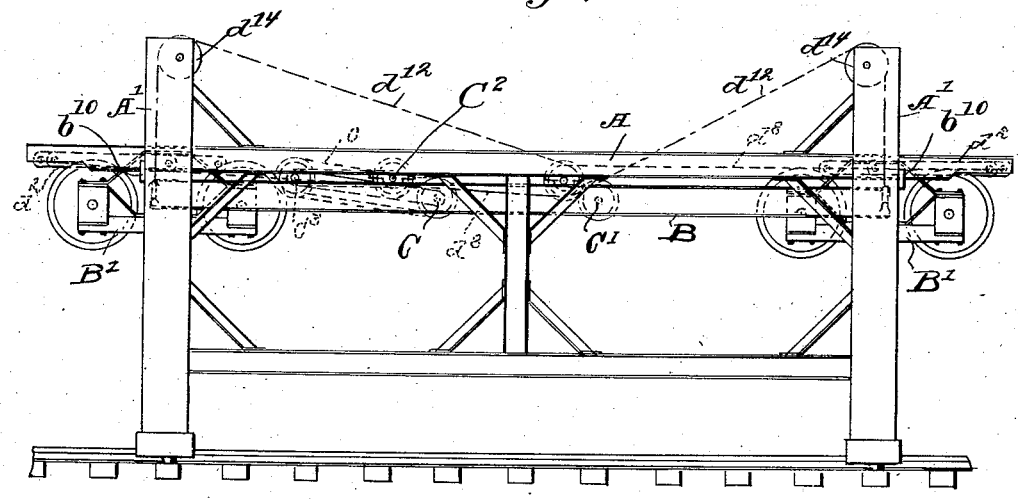
Figure 8:
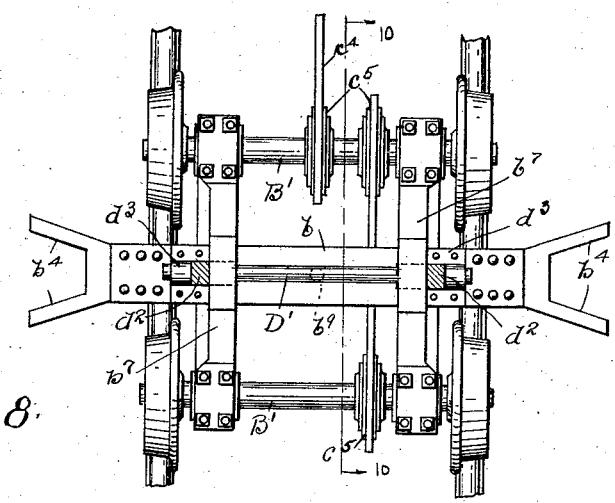
Figure 9:
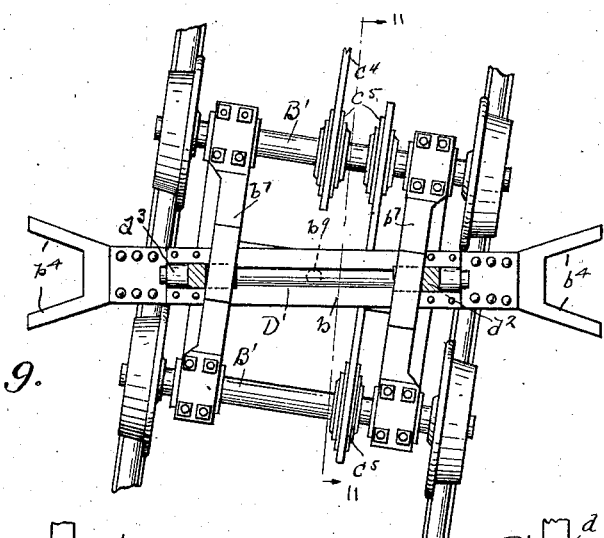
Figure 10:
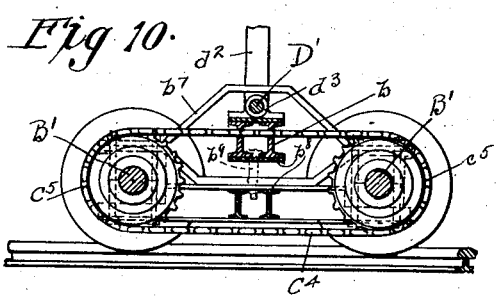
Figure 11:
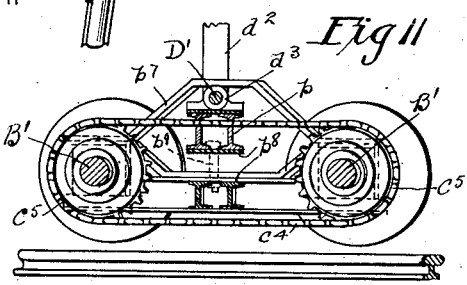

In said annexed drawings:—Figure 1 is a longitudinal section through the machine, save at the left end where a portion appears in elevation although in front of the plane of the section proper; Fig. 2 is an end view of the machine showing the same as supported upon the transporting means forming the object of present interest; Fig. 3 is a similar view of the machine but showing such transporting means raised out of the way, as when the machine is set up for operation; Fig. 4 is a transverse sectional view of the machine taken on the line 4—4, Fig. 1, and showing certain details of the propelling mechanism; Fig. 5 is a plan view of the deck of the machine and of the engine and winding drums mounted thereon; Figs. 6 and 7 are side elevational views similar to Fig. 1 but on a smaller scale, and showing the parts in different operative positions; Fig. 8 is a plan view of one of the trucks with a portion of the supporting frame therefor, the latter being sectioned upon the horizontal plane indicated by the line 8—8, Fig. 2, and said truck being shown in normal position, that is, alined with the frame or body of the loader; Fig. 9 is a view similar to Fig. 8 but showing the truck turned as it would be in rounding a curve; Fig. 10 is a vertical section of such truck taken on the line 10—10, Fig. 8, and showing the truck as resting on the track in which position it supports the loader-frame; and Fig. 11 is a vertical section on the line 11—11 of Fig. 9 and furthermore showing the truck as raised from the track.

The main frame of the machine, consisting of the engine-supporting platform or deck A and the four inwardly curved rigid legs or standards A′ is of substantially the same construction as that disclosed in my patent above identified. The engine $A^3$ is mounted on such platform in the same way, and while certain changes in construction are shown in connection with the boom-swinging mechanism $A^2$ for loading, these likewise form the subject matter of an issued patent, viz. No. 907,631, dated December 22, 1908. For the purpose of movably supporting the aforesaid frame together with the mechanism mounted thereon when it is desired to transport the same from one place to another, I utilize, in the present improved form of my loader, an independent frame or sub-frame B which carries the trucks B' that ultimately support the load, said sub-frame being in turn connected to the main frame of the machine so as both to thus support the same and to be capable of being raised or withdrawn up within the same. Such sub-frame is composed of body bolsters $b$ between which extend longitudinal beams $b'$ that connect said body bolsters and also serve as a support for the propelling shafts C C' which will be described later. This frame is stiffened by cross beams $b^2$, preferably of the I-section shown, that are disposed between such longitudinal extending beams $b'$. The body bolsters $b$ are provided with center plates $b^8$ and king bolts $b^9$ whereby they are mounted upon the trucks, which have four wheels and are similar in a general way to the trucks used on an ordinary railway car, except that they are so constructed as to allow the frame to hang lower than in ordinary car construction.

Between the longitudinally extending beams $a$ of the main frame deck near each end of the latter, are fixed short transverse shafts D, on which are journaled arms $d$ that are in turn journaled at their lower ends on other shafts $d'$. Other arms $d^2$, similar in construction to said arms $d$ are journaled on shaft $d'$ at their upper extremities, and at their lower ends on shafts D' that are secured by means of suitable boxes $d^3$ to the body bolsters of the sub-frame. The framework, consisting of such pairs of arms $d$ and $d^2$ and shafts $d'$ and D' forms substantially a vertical toggle joint, one at each end of the frame, between the main frame and the sub-frame, or between such main frame and the trucks, in case the sub-frame were not continuous between the latter. In addition to the aforesaid arms, yet another pair of arms, or links $d^4$ are journaled at their lower ends on intermediate shafts $d'$ of each such pair of toggle joints, said links $d^4$ being secured near their upper ends to blocks $d^5$ which are slidably held in the channels formed by the sides of the longitudinal beams constituting the respective lateral portions of the deck A of the main frame, such beams being of I-section. Movement of these blocks in a backward direction is limited by buffers $d^6$ secured to the inner sides of the same beams and provided with springs $d^7$ which are compressed when the blocks are thrown back the full length of their movement, such springs being of strength such as to force the blocks forwardly when permitted. Normally said blocks are retained in their rearmost positions, wherein said springs are thus compressed, by means of cables $d^8$, two to each pair of toggle joints, which cables are secured at their free ends to eyes $d^9$ on the ends of the arms or links $d$ and at their other ends are wound upon double grooved drums $d^{10}$ carried by a shaft $D^2$ transversely journaled in the platform A and connected to be driven from the hoisting engine $A^3$ through a worm $a^2$ and worm gear $d^{11}$. Two additional cables $d^{12}$ are provided in connection with each toggle joint, being secured at their free ends to the corresponding body bolster $b$, thence passing over sheaves $d^{14}$, and being wound at their other ends upon two double grooved drums $d^{13}$ similar to drums $d^{10}$ and mounted upon the same shaft. The arrangement of these several sets of cables is such that if shaft $D^2$ and thereby the drums $d^{10}$ and $d^{13}$, as viewed in Fig. 1, are revolved in the direction of the hands of a clock, cables $d^8$ will be slackened, thus permitting the springs $d^7$ behind the buffers $d^6$ to throw forward the blocks $d^5$; and thereby causing the arms or links $d^4$ to thrust forward shaft $d'$ and so throw the toggle out at the center, (see Fig. 6). The weight of the machine is thus given an opportunity to further cause the toggle joint to buckle outwardly until the frame is lowered and the shoes $a^3$ on standards A' brought into contact with the ties of the track, upon which it is intended the machine should be supported when in operation. By continuing the rotation of shaft $D^2$, the other cables $d^{12}$ are wound up so as to elevate the trucks B' until they reach the position shown in Figs. 3 and 7. Not only do the arms or links thus serve the purpose of automatically forcing out the knee of the toggle, when cables $d^8$ are released and so permit the machine to settle down and the toggles to fold sufficiently upon themselves so that the trucks may be raised vertically by means of cables $d^{12}$; but said springs at the same time form a strong and substantial yet elastic stop to the drawing in of the knees of the toggles in the converse operation, preventing any tendency of the toggles to collapse inwardly, hence steadying and rendering rigid the connection between the main frame A and the sub-frame B when the former is supported upon the latter.

As will be understood the trucks of the machine, or the sub-frame as a whole, are raised and lowered vertically, the movement of the toggles at the respective ends of the machine being simultaneous. When in their lowered position they are locked by the engagement of the outer bifurcated ends $b^4$ of the body bolsters $b$ with the inturned lower ends of the legs, or standards, A' of the main frame, such bifurcated ends of the bolsters being flared sufficiently to insure such engagement taking place when the bolster is forced into its lowered position, or rather the main frame raised into its upper position. By this means such main frame is rigidly secured to trucks B' or sub-frame B and both longitudinal and lateral strains avoided.

From a reference to Figs. 2 and 3 it will be observed that drums $d^{10}$ $d^{13}$, on which the cables $d^8$ $d^{12}$ are wound, are of the same size, whereas the length of said cables that is required to be unwound in order to let the toggle joints fold up, is only half as much as the length of cables $d^{12}$ that it is necessary to wind up in raising the trucks to their upward position. Furthermore, the cables $d^8$ require to be slackened considerably before the trucks can be elevated by means of said cables $d^{12}$ at all. In order, accordingly, to permit all of the drums just referred to to be keyed on a single shaft and to wind in at the same speed as is highly desirable by reason of the simpler construction thus secured, I provide a sufficient amount of slack in the cables $d^{12}$ when the trucks are lowered, so that there will be no tension on said cables until the toggle joint is thrown out to an angle of about 30 degrees. At that angle the slack in cable $d^{12}$ will be taken up and the further winding in of said cables will elevate the trucks without binding. By way of converse to the foregoing, it follows that when cables $d^{12}$ are wound in sufficiently to elevate the trucks, the cables $d^8$ will be unreeled to such an extent as to throw considerable slack in them, unless provision be made to avoid this difficulty. With this in view I accordingly attach said cable $d^8$ to their drums $d^{10}$ so that when the trucks are elevated about three quarters of their height said cables will have been fully paid out and will again begin to be wound up on the drums; in this way enough of the slack is taken up so that the cables will not be in the way. They of course do not require to be drawn up taut. During the lowering of the trucks, the cables $d^8$ will obviously first slacken until the trucks are about one-quarter of the way down and then they begin to tighten up, becoming tense at the point where the trucks strike the rails. As only one set of the cables is employed at the same time, there is no objection to having slack in the other cables at certain points in the raising and lowering operation.

As the trucks are raised and lowered they might tend to swing forwardly or backwardly in relation to the main frame unless some provision is made to prevent them, and with this in view, I provide holding cables $b^5$ that extend from the upper cross girders $a^4$, at each end of the main frame deck to the oppositely located bolster $b$, these cables being of such a length that they are drawn taut when the trucks occupy their lowermost position. Such cables will, of course, slacken when the trucks are elevated, but not to a sufficient degree to cause any trouble. The trucks, moreover, are held rigidly by the toggle joints themselves against any such longitudinal movement when they are in the full elevated position shown in Figs. 3 and 7. In place of cables $b^5$, for retaining the trucks against longitudinal movement during and after elevation of the sub-frame, arms $b^{10}$ may be provided, extending laterally from the bolster $b$ and bearing against the outer faces of the side member A' of the main frame.

To propel the machine, driving connections are provided between trucks B' thus carried in the movable sub-frame, and the rear drum shaft $a^5$ of the engine $A^3$ that is mounted on the main frame deck, as previously stated. These connections comprise a series of three transverse shafts C $C^2$ and $C^3$, the first of which along with a supplementary shaft C' is mounted in the sub-frame, and has already been referred to, the second of which is mounted in the main frame, while the third forms the pivotal axis of a supplementary toggle joint, that is adapted to fold up just as do the main toggles at either end of the machine, when the sub-frame is raised. Such supplementary toggle, as in the case of the main toggles, is made up of two pairs of arms or links $c$ $c'$ that are pivoted to said shafts C $C^2$ and $C^3$. Such series of three shafts are operatively connected with each other, and the uppermost thereof with the engine shaft $a^5$, by means of sprockets $c^2$ and sprocket chains $c^3$, while other chains $c^4$ similarly serve to connect the lower shaft C with a sprocket $c^6$ on intermediate shaft C' and with sprockets $c^5$ on the trucks B'. By utilizing such toggle support for the driving connections, it will be seen that the propelling chains are always held with an even tension on the sprockets no matter what position the trucks may be in; they also serve the purpose of resisting the upward stresses due to the tension on the chains in propelling the machine; for, were the chains run directly from the sprocket on the upper deck to the cross shaft on the sub-frame, they would throw an exceedingly objectionable load on such latter frame, one which would be difficult to provide for in the construction of the frame. All this is obviated by the arrangement just described.

When the trucks are elevated it is of course, desirable that they should remain in the same alinement (that is in the same axial position horizontally) as they were in before being elevated, in order that, when lowered, they will come down true upon the rails, thus avoiding the necessity for swinging or adjusting them. In order to secure this result, I secure straps $b^7$ to the tops of the respective journal boxes of each truck, which straps pass over the boxes $d^3$ mounted on the truck bolster $b$, in order to secure thereto the shafts D'. When the trucks are in their lowered position and the weight of the main frame is on the bolsters, the trucks may pivot freely on the king bolts and the plates also allow a limited amount of side tipping of the frame. In this position of the parts the straps are not in contact with the journal boxes but are a little above them. When the bolsters are elevated, they move vertically relatively to the trucks until the journal boxes contact with the straps whereupon the trucks are raised and remain suspended by the straps. The friction on the straps is sufficient to prevent the trucks while in their elevated position, from swinging around such bolts, so that when they are again lowered they will engage the rails in the same relative positions as before they were raised.

The construction and arrangement of the trucks just described will be better understood from a reference to Figs. 8 to 11 inclusive. Thus Figs. 8 and 10 represent in plan view and in vertical section respectively, a truck, in what may be termed its normal position, that is in alinement with the body of the loader. In said Fig. 10, moreover, such truck is shown as resting on the track in which condition it pivots freely on the kind bolt $b^9$, the strap $b^7$, (of which only one, of course, appears in said figure), passing above and out of contact with the corresponding journal box $d^3$. In the plan view of Fig. 9 on the contrary the truck is represented as out of alinement with the frame of the loader, a condition which it will assume in passing around a curve. If then the sub-frame to which trucks are pivoted be elevated, said trucks will not be lifted from the track at once, but only after the sub-frame has been raised through the distance between the boxes $d^3$ and the straps $b^7$. If such raising occur with the truck turned as in Fig. 10, the particular strap illustrated in Fig. 11 will be engaged as there shown, namely not centrally, but to one side or the other, depending upon which direction the truck was thus turned.

The foregoing description, it is believed, will afford a sufficient basis for understanding the general mode of operation of the machine, such general operation involving the alternate depression or lowering of the trucks so as to render the machine as a whole transportable, whereupon it can be removed from one place to another with its own power through the driving mechanism provided for this purpose. Such driving mechanism, of course, may be omitted and independent propelling means, as a locomotive, utilized to draw the structure about. When the place selected for the loading operation is reached, the trucks are raised or withdrawn within the frame of the machine, so as to leave the track clear between standards that support such frame, and to permit the passage of logging cars therethrough. Despite the increased strength and supporting capacity of the trucks which are provided in the machine, this alternate raising and lowering of the same, it will be seen, is readily accomplished; while, in the lowered position in which they carry the whole frame, and the mechanism mounted thereon, the degree of rigidity necessary to render such transportation safe is secured although still leaving sufficient flexibility for the rounding of curves and passing over irregularities in the track.

It will be understood in conclusion that my improved arrangement for raising and lowering the trucks, while thus designed primarily for trucks of four wheels instead of the two-wheeled trucks which are employed in the original form of the McGiffert loader, may nevertheless be applied satisfactorily to the raising and lowering of the simpler two-wheeled trucks as will be readily understood.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a machine of the class described, the combination of a frame adapted to span a track; a truck adapted to run on such track; and connections, including toggle-means, between said frame and truck.

2. In a machine of the class described, the combination of a frame adapted to span a track; a truck adapted to run on such track; connections, including a toggle-joint, between said frame and truck; means tending to bend said joint; and other means adapted to straighten the same.

3. In a machine of the class described, the combination of a frame adapted to span a track; a truck adapted to run on such track; connections, including a toggle-joint, between said frame and truck; means adapted to raise and lower said truck; means tending to bend said joint; and other means adapted to straighten the same.

4. In a machine of the class described, the combination of a frame adapted to span a track; a truck adapted to run on such track; connections, including a toggle-joint, between said frame and truck; a spring tending to bend said joint; and a cable adapted to straighten the same.

5. In a machine of the class described, the combination of a frame adapted to span a track; a truck adapted to run on such track; connections, including a toggle-joint, between said frame and truck; a cable adapted to raise and lower said truck; and another cable adapted to straighten said joint.

6. In a machine of the class described, the combination of a frame adapted to span a track; a truck adapted to run on such track; connections, including a toggle-joint, between said frame and truck; a cable adapted to raise and lower said truck; a spring tending to bend said joint; and another cable adapted to straighten the same.

7. In a machine of the class described, the combination of a frame adapted to span a track; a truck adapted to run on such track; connections, including a toggle-joint, between said frame and truck; a cable adapted to raise and lower said truck; another cable adapted to straighten said joint; and means adapted simultaneously to wind in said first, and unwind said second, cable, or vice versa.

8. In a machine of the class described, the combination of a frame adapted to span a track; a truck adapted to run on such track; connections, including a toggle-joint, between said frame and truck; a cable adapted to raise and lower said truck; another cable adapted to straighten said joint; and means adapted to wind in said first cable to thus raise said truck, said means being adapted simultaneously to unwind said second cable during the first part, and then to wind in the same during the latter part, of such raising operation, or vice versa during the lowering operation.

9. In a machine of the class described, the combination of a frame adapted to span a track; a truck adapted to run on such track; connections, including a toggle-joint, between said frame and truck; a cable adapted to raise and lower said truck; another cable adapted to straighten said joint; and winding means for said cables comprising a common shaft and drums mounted thereon for said cables respectively, said cables being oppositely wound on said drums, whereby rotation of said shaft is adapted simultaneously to wind in said first, and unwind said second, cable, or vice versa.

10. In a machine of the class described, the combination of a frame adapted to span a track; a truck adapted to run on such track; connections, including a toggle-joint, between said frame and truck; a cable adapted to raise and lower said truck; another cable adapted to straighten said joint; and winding means for said cables comprising a common shaft and drums mounted thereon for said cables respectively, said cables being oppositely wound on said drums, whereby rotation of said shaft is adapted simultaneously to wind in said first, and unwind said second, cable, or vice versa, said second cable, however, being so attached to its drum as to be wound in during the latter part of the raising operation and to be unwound during the first part of the lowering operation.

11. In a machine of the class described, the combination of a main frame adapted to span a track; a supplementary frame vertically movable in said main frame and provided with trucks adapted to run on such track; and toggle-means adapted to raise and lower said main frame relatively to said supplementary frame.

12. In a machine of the class described, the combination of a main frame adapted to span a track; a supplementary frame vertically movable within said main frame and provided with trucks adapted to run on such track; and connections between said main and supplementary frames, said connections including two oppositely disposed toggle-joints, one at each end of said frames.

13. In a machine of the class described, the combination of a main frame adapted to span a track; a supplementary frame vertically movable within said main frame and provided with trucks adapted to run on such track; connections between said main and supplementary frames, said connections including oppositely disposed toggle-joints at the respective ends of said frames; means tending to bend said joints; and other means adapted to straighten said joints simultaneously, one at each end of said frames.

14. In a machine of the class described, the combination of a main frame adapted to span a track; a supplementary frame vertically movable within said main frame and provided with trucks adapted to run on such track; connections between said main and supplementary frames, said connections including oppositely disposed toggle-joints at the respective ends of said frames; means adapted to raise and lower said supplementary frame; means tending to bend said joints; and other means adapted to straighten said joints simultaneously at both ends of said frames.

15. In a machine of the class described, the combination of a main frame adapted to span a track; a supplementary frame vertically movable within said main frame and provided with trucks adapted to run on such track; connections between said main and supplementary frames, said connections including oppositely disposed toggle-joints at the respective ends of said frames; means adapted to raise and lower said supplementary frame; springs tending to bend said joints; and other means adapted to straighten said joints simultaneously at both ends of said frames.

16. In a machine of the class described, the combination of a main frame adapted to span a track; a supplementary frame vertically movable within said main frame and provided with trucks adapted to run on such track; connections between said main and supplementary frames, said connections including oppositely disposed toggle-joints at the respective ends of said frames; cables adapted to raise and lower said supplementary frame; and other cables adapted to straighten said joints simultaneously at both ends of said frames.

17. In a machine of the class described, the combination of a main frame adapted to span a track; a supplementary frame vertically movable within said main frame and provided with trucks adapted to run on such track; connections between said main and supplementary frames, said connections including oppositely disposed toggle-joints at the respective ends of said frames; cables adapted to raise and lower said supplementary frame; springs tending to bend said joints; and other cables adapted to straighten said joints simultaneously at both ends of said frames.

18. In a machine of the class described, the combination of a main frame adapted to span a track; a supplementary frame vertically movable within said main frame and provided with trucks adapted to run on such track; connections between said main and supplementary frame, said connections including oppositely disposed toggle-joints at the respective ends of said frames; cables connected with the respective ends of said supplementary frame to raise and lower the same; other cables adapted to straighten said joints simultaneously at both ends of said frames; and means adapted simultaneously to wind in said first-named, and un-wind said last-named, cables, or vice versa.

19. In a machine of the class described, the combination of a main frame adapted to span a track; a supplementary frame vertically movable within said main frame and provided with trucks adapted to run on such track; connections between said main and supplementary frame, said connections including oppositely disposed toggle-joints at the respective ends of said frames; cables connected with the respective ends of said supplementary frame to raise and lower the same; other cables adapted to straighten said joints simultaneously at both ends of said frames; and means adapted to wind in said first-named cables to thus raise said supplementary frame, said means being adapted simultaneously to un-wind said last-named cables during the first part, and then to wind in the same during the latter part, of such raising operation, and vice versa during the lowering operation.

20. In a machine of the class described, the combination of a main frame adapted to span a track; a supplementary frame vertically movable within said main frame and provided with trucks adapted to run on such track; connections between said main and supplementary frame, said connections including oppositely disposed toggle-joints at the respective ends of said frames; cables connected with the respective ends of said supplementary frame and thence passing over sheaves on said main frame, so as to be adapted to raise and lower said supplementary frame; other cables adapted to straighten the joints simultaneously at both ends of said frames; and winding means for said cables comprising a shaft in said main frame intermediately between its ends, and drums mounted thereon for said cables respectively, said first-named and last-named cables being oppositely wound on said drums, whereby rotation of said shaft is adapted simultaneously to wind in said first-named, and un-wind said last-named, cables, or vice versa.

21. In a machine of the class described, the combination of a main frame adapted to span a track; a supplementary frame vertically movable within said main frame and provided with trucks adapted to run on such track; connections between said main and supplementary frame, said connections including oppositely disposed toggle-joints at the respective ends of said frames; cables connected with the respective ends of said supplementary frame and thence passing over sheaves on said main frame, so as to be adapted to raise and lower said supplementary frame; other cables adapted to straighten the joints simultaneously at both ends of said frames; and winding means for said cables comprising a shaft in said main frame intermediately between its ends, and drums mounted thereon for said cables respectively, said first-named and last-named cables being oppositely wound on said drums, whereby rotation of said shaft is adapted simultaneously to wind in said first-named, and un-wind said last-named, cables, or vice versa, said last-named cables, however, being so attached to their drums as to be wound in during the latter part of the raising operation and to be unwound during the first part of the lowering operation.

22. In a machine of the class described, the combination of a frame adapted to span a track; a truck adapted to run on such track; means adapted to raise and lower said truck relatively to said frame; and other means adapted to raise and lower said frame relatively to said truck.

23. In a machine of the class described, the combination of a frame adapted to span a track; a truck adapted to run on such track; cable means adapted to raise and lower said truck relatively to said frame; and toggle-means adapted to raise and lower said frame relatively to said truck.

24. In a machine of the class described, the combination of a frame adapted to span a track; a truck adapted to run on such track; extensible connections between said frame and truck; and a holding cable between said frame and truck adapted to be rendered taut when said connections are extended.

25. In a machine of the class described, the combination of a frame adapted to span a track; a truck adapted to run on such track; connections, including a toggle joint, between said frame and truck; and a holding cable between said frame and truck adapted to be rendered taut when said joint is straightened.

26. In a machine of the class described, the combination of a main frame adapted to span a track; a supplementary frame vertically movable in said main frame and provided with trucks adapted to run on such track; extensible connections between said main and supplementary frames; and holding cables running from one end of said main frame to the opposite end of said supplementary frame and adapted to be rendered taut when said connections are extended.

27. In a machine of the class described, the combination of a main frame adapted to span a track; a supplementary frame vertically movable in said main frame and provided with trucks adapted to run on such track; connections between said main and supplementary frames, said connections including oppositely disposed toggle-joints at the respective ends of said frames; and holding cables running from one end of said main frame to the opposite end of said supplementary frame and adapted to be rendered taut when said joints are straightened.

28. In a machine of the class described, the combination of a frame provided with standards adapted to span a track; a truck adapted to run on such track; and extensible connections between said frame and truck, the latter being adapted, when in lowered position, to engage with such standards so as to be held against relative longitudinal movement.

29. In a machine of the class described, the combination of a frame provided with standards adapted to span a track and having their lower ends curved inwardly; a truck adapted to run on such track; connections, including a toggle-joint, between said frame and truck; and bifurcated projections carried by said truck and adapted, in said truck's lowered position, to engage with the lower ends of such standards so as to be held against relative longitudinal movement.

30. In a machine of the class described, the combination of a main frame provided with standards adapted to span a track; a supplementary frame vertically movable relatively to said main frame and provided with trucks adapted to run on such track; and extensible means between said main and supplementary frames, adapted thus to move said supplementary frame, the latter being adapted, when in lowered position, to engage with such standards so as to be held against relative longitudinal movement.

31. In a machine of the class described, the combination of a main frame provided with standards adapted to span a track and having their lower ends curved inwardly; a supplementary frame vertically movable within said main frame and provided with trucks adapted to run on such track; connections between said main and supplementary frames, said connections including two oppositely disposed toggle-joints, one at each end of said frames; and bifurcated projections attached to said supplementary frame and adapted, in the latter's lowered position, to engage with such standards so as to be held against relative longitudinal movement.

32. In a machine of the class described, the combination of a frame adapted to span a track; a truck adapted to run on such track; a toggle-joint between said frame and truck; a block longitudinally movably secured to said frame; and a link connecting said joint with said block.

33. In a machine of the class described, the combination of a frame adapted to span a track; a truck adapted to run on such track; a toggle-joint between said frame and truck; a block longitudinally movably secured to said frame; a link connecting said joint with said block; and means adapted to straighten said joint.

34. In a machine of the class described, the combination of a frame adapted to span a track; a truck adapted to run on such track; a toggle-joint between said frame and truck; a block longitudinally movably secured to said frame; a link connecting said joint with said block; a buffer limiting the movement of said block in a direction to straighten said joint; and means adapted thus to straighten said joint.

35. In a machine of the class described, the combination of a frame adapted to span a track; a truck adapted to run on such track; a toggle-joint between said frame and truck; a block longitudinally movably secured to said frame; a link connecting said joint with said block; a spring buffer limiting the movement of said block in a direction to straighten said joint; and a cable adapted thus to straighten said joint.

36. In a machine of the class described, the combination of a frame adapted to span a track; a truck adapted to run on such track; a toggle-joint between said frame and truck; a block longitudinally movably secured to said frame; a link connecting said joint with said block; a spring buffer limiting the movement of said block in a direction to straighten said joint; a cable adapted thus to straighten said joint; and a holding cable extending from said frame to said truck and adapted to be rendered taut when said joint is thus straightened.

37. In a machine of the class described, the combination of a main frame adapted to span a track; a supplementary frame; a truck adapted to run on such track and pivotally attached to said supplementary frame; and extensible connections between said main and supplementary frames, whereby the former may be raised relatively to the latter.

38. In a machine of the class described, the combination of a main frame adapted to span a track; a supplementary frame; a truck adapted to run on such track and pivotally attached to said supplementary frame; means adapted to raise and lower said supplementary frame relatively to said main frame; and other means adapted to raise and lower said main frame relatively to said supplementary frame.

39. In a machine of the class described, the combination of a main frame adapted to span a track; a supplementary frame; a truck adapted to run on such track and pivotally attached to said supplementary frame; means adapted to raise and lower said supplementary frame relatively to said main frame; means adapted to raise and lower said main frame relatively to said supplementary frame; and means adapted to retain said truck in unchanged axial position relatively to said supplementary frame pending the raising and lowering of said frame.

40. In a machine of the class described, the combination of a main frame adapted to span a track; a supplementary frame including a bolster; a truck adapted to run on such track and pivotally attached to said bolster; means adapted to raise and lower said supplementary frame relatively to said main frame, said truck having limited vertical movement relatively to said bolster upon said frame being thus raised; and means adapted, upon such relative movement between said truck and bolster, to retain the latter in unchanged axial position relatively to said bolster.

41. In a machine of the class described, the combination of a main frame adapted to span a track; a supplementary frame including a bolster; a truck adapted to run on such track and pivotally attached to said bolster; means adapted to raise and lower said supplementary frame relatively to said main frame, said truck having limited vertical movement relatively to said bolster upon said frame being thus raised; and straps on said truck passing over said bolster and adapted, upon such relative movement between said truck and bolster, to frictionally engage the latter and so retain said truck in unchanged axial position relatively thereto.

42. In a machine of the class described, the combination of a main frame adapted to span a track; a supplementary frame including a bolster; a truck adapted to run on such track and pivotally attached to said bolster; cable means adapted to raise and lower said supplementary frame relatively to said main frame, said truck having limited vertical movement relatively to said bolster upon said frame being thus raised; straps on said truck passing over said bolster and adapted, upon such relative movement between said truck and bolster, to frictionally engage the latter and so retain said truck in unchanged axial position relatively thereto; and toggle-means adapted to raise and lower said main frame relatively to said supplementary frame.

43. In a machine of the class described, the combination of a frame adapted to span a track; a truck adapted to run on said track; means adapted to raise and lower said truck relatively to said frame; driving connections between said truck and frame; and a support for said connections jointed intermediate the truck and frame.

44. In a machine of the class described, the combination of a frame adapted to span a track; a truck adapted to run on said track; means adapted to raise and lower said truck relatively to said frame; driving connections between said truck and frame; and a toggle-joint for supporting said connections.

45. In a machine of the class described, the combination of a main frame adapted to span a track; a supplementary frame vertically movable in said main frame and provided with trucks adapted to run on such track; two oppositely disposed toggle-joints between said main and supplementary frames; driving connections between said frames; and a third toggle-joint for supporting said driving connections.

46. In a machine of the class described, the combination of a main frame adapted to span a track; a bolster secured thereto; and a truck adapted to run on said track and pivotally attached to said bolster.

47. In a machine of the class described, the combination of a main frame adapted to span a track; a supplementary frame including a bolster; and a truck adapted to run on said track and pivotally attached to said bolster.

48. In a machine of the class described, the combination of a main frame adapted to span a track; a bolster secured thereto; a truck adapted to run on said track and pivotally attached to such bolster; and means for raising and lowering the bolster relatively to the frame.

49. In a machine of the class described, the combination of a main frame adapted to span a track; a bolster secured thereto; and a truck adapted to run on said track and pivotally attached to said bolster about a substantially vertical axis.

50. In a machine of the class described, the combination of a main frame adapted to span a track; a bolster secured thereto; a truck adapted to run on said track and pivotally attached to said bolster about a substantially vertical axis; and means for raising and lowering said bolster relatively to the frame.

Signed by me this 25th day of March, 1910.

JOHN R. McGIFFERT.

Attested by—
F. C. ADAMS,
D. K. LEE.

Copies of this patent may be obtained for five cents each, by addressing the "Commissioner of Patents, Washington, D. C."